(12) United States Patent
Kondo et al.

(10) Patent No.: US 7,990,656 B2
(45) Date of Patent: Aug. 2, 2011

(54) MAGNETIC HEAD DEVICE

(75) Inventors: Yasuyuki Kondo, Tokyo (JP); Jun Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 678 days.

(21) Appl. No.: 12/125,946

(22) Filed: May 23, 2008

(65) Prior Publication Data

US 2009/0073612 A1 Mar. 19, 2009

(30) Foreign Application Priority Data

May 23, 2007 (JP) .................................. 2007-136747

(51) Int. Cl.
*G11B 5/60* (2006.01)
(52) U.S. Cl. .................................................. 360/235.4
(58) Field of Classification Search ............... 360/235.4, 360/234.5, 236.5, 236.6, 234.6, 235.6, 245.5, 360/235.7, 235.1; 29/603.06, 603.12
See application file for complete search history.

(56) References Cited

U.S. PATENT DOCUMENTS

| 6,137,656 A * | 10/2000 | Levi et al. ............... 360/235.4 |
| 6,989,965 B2 * | 1/2006 | Mundt et al. ............ 360/235.4 |
| 7,061,727 B2 * | 6/2006 | Hoshino et al. ........... 360/320 |
| 2005/0285526 A1 * | 12/2005 | Moon et al. .................... 313/582 |
| 2007/0153420 A1 * | 7/2007 | Kondo ....................... 360/234.7 |
| 2008/0259499 A1 * | 10/2008 | Hu et al. .................... 360/235.4 |
| 2010/0039732 A1 * | 2/2010 | Shen et al. ................ 360/235.4 |
| 2010/0309586 A1 * | 12/2010 | Ruiz ......................... 360/235.4 |

FOREIGN PATENT DOCUMENTS

| JP | 2004-55127 | 2/2004 |
| JP | 2005-285218 | 10/2005 |

* cited by examiner

*Primary Examiner* — Allen T Cao
(74) *Attorney, Agent, or Firm* — Brinks Hofer Gilson & Lione

(57) ABSTRACT

A magnetic head device includes a slider with a facing side and a magnetic function part. The facing side of the slider includes a front positive pressure surface located close to a leading end of the slider, a rear positive pressure surface located close to a trailing end of the slider, and a pair of side positive pressure surfaces located closer to the trailing end than the front positive pressure surface and disposed at both sides of a longitudinally extending centerline. Air inlet grooves for introducing air into the side positive pressure surfaces are each disposed in front of each side positive pressure surface. Each air inlet groove extends between the front positive pressure surface and a corresponding side face of the slider and opens toward a leading end face of the slider.

4 Claims, 6 Drawing Sheets

(A)

(B)

MAGNETIC HEAD DEVICE

CLAIM OF PRIORITY

This application claims benefit of the Japanese Patent Application No. 2007-136747 filed on May 23, 2007, the entire content of which is hereby incorporated by reference.

BACKGROUND

1. Field of the Invention

The present invention relates to a magnetic head device having a magnetic function part in a slider opposed to a magnetic recording medium such as a hard disk. More particularly, the invention relates to a magnetic head device which can suppress a variation in floating distance from the recording medium due to a change in air density.

2. Description of the Related Art

As a magnetic head device which records a magnetic signal on a magnetic recording medium such as a hard disk and reads the magnetic signal recorded on the magnetic recording medium, there is a type having a slider opposed to the magnetic recording medium and a magnetic function part disposed at a trailing end of the slider. The magnetic function part has a reproduction function part that makes use of an MR effect, a GMR effect, or a TMR effect and a recording function part in which a yoke of a magnetic material, a coil, etc. are formed of a thin film.

The slider of the magnetic head device is pressed to a surface of the magnetic recording medium by an elastic member called a loading beam. When the magnetic recording medium rotates, the slider floats from the recording medium by an airflow (air bearing) introduced between the surface of the recording medium and the slider, thereby setting a given floating amount between the magnetic function part and the recording medium.

Patent Documents 1 and 2 disclose a magnetic head device in which a front positive pressure surface, a rear positive pressure surface, and a pair of side positive pressure surfaces are provided on a recording medium-facing side of a slider. The front positive pressure surface is located close to a leading end and generates a floating pressure by an airflow, the rear positive pressure surface is located close to a trailing end and also generates a floating pressure, and the side positive pressure surfaces are located closer to the trailing end than the front positive pressure surface and spaced apart from each other in a transverse direction.

In this magnetic head device, a floating pressure acting on the front and rear positive pressure surfaces is utilized to stabilize a floating posture of the slider with a given pitch angle where the leading end face is lifted higher than the trailing end face, while a floating pressure acting on the left and right side positive pressure surfaces is utilized to stabilize a posture of the slider in a rolling direction. This aims at properly setting a floating distance of a magnetic function element, which is disposed close to the trailing end of the slider, from the recording medium.

Patent Document 1:
Japanese Unexamined Patent Application Publication No 2004-55127

Patent Document 2:
Japanese Unexamined Patent Application Publication No 2005-285218

In recent magnetic head devices, the floating amount of the magnetic function part from the recording medium is set as small as possible in order to improve magnetic recording density of the magnetic recording medium and achieve higher recording speed and reproduction speed of the magnetic signal. However, when reducing the floating distance of a slider from a magnetic recording medium, the floating amount easily reduces in response to a decrease in air density corresponding to a change in altitude. As a result, the slider is liable to contact the surface of the recording medium when it is used at a high altitude or in an airplane.

In the magnetic head device disclosed in Patent Documents 1 and 2, since the floating pressure acting on all the positive pressure surfaces of the slider, i.e., the front positive pressure surface, the rear positive pressure surface and the side positive pressure surfaces, decreases with a decrease in air density, the floating distance of the slider tends to extremely reduce, causing the problem that the slider contacts the recording medium.

SUMMARY

The present invention is to solve the problem of the prior art and has an object to provide a magnetic head device which can suppress a variation in floating amount due to a change in air density of an environment while reducing a floating distance of a magnetic function part from a recording medium.

According to a first aspect of the present invention, there is provided a magnetic head device comprising:

a slider having a facing side opposed to a recording medium and a pressed side subjected to a pressing force toward the recording medium; and a magnetic function part disposed close to a trailing end of the slider to perform at least either magnetic recording or magnetic reproducing, wherein the facing side of the slider includes a front positive pressure surface located close to a leading end of the slider, a rear positive pressure surface located close to the trailing end, and a pair of side positive pressure surfaces located closer to the trailing end than the front positive pressure surface and disposed at both sides of a longitudinally extending centerline, wherein air inlet grooves for introducing air into the side positive pressure surfaces are each disposed in front of each side positive pressure surface, and each air inlet groove extends between the front positive pressure surface and a corresponding side face of the slider and opens toward a leading end face of the slider.

In the first aspect of the invention, for example, each air inlet groove opens forwardly on the leading end face of the slider. Alternatively, each air inlet groove may have a forwardly opening mouth located behind the leading end face of the slider and alongside the front positive pressure surface.

According to a second aspect of the present invention, there is provided a magnetic head device comprising:

a slider having a facing side opposed to a recording medium and a pressed side subjected to a pressing force toward the recording medium; and a magnetic function part disposed close to a trailing end of the slider to perform at least either magnetic recording or magnetic reproducing, wherein the facing side of the slider includes a front positive pressure surface located close to a leading end of the slider, a rear positive pressure surface located close to the trailing end, and a pair of side positive pressure surfaces located closer to the trailing end than the front positive pressure surface and disposed at both sides of a longitudinally extending centerline, wherein air inlet grooves for introducing air into the side positive pressure surfaces are each disposed in front of each side positive pressure surface with an air guide part, which leads to each air inlet groove, being disposed between the front positive pressure surface and a corresponding side face of the slider.

In the second aspect of the invention, for example, each air inlet groove has a forwardly opening mouth located closer to the trailing end than the front positive pressure surface.

In the present invention, when a recording medium is rotating with a slider being opposed to the recording medium, an airflow on the surface of the recording medium can be concentrated at the side positive pressure surfaces through the air inlet grooves without being blocked by the front positive pressure surface, so that the side positive pressure surfaces can always generate a stable floating pressure. Thus, a floating distance at the side positive pressure surfaces can be prevented from extremely decreasing with a decrease in air density. Accordingly, although the pitch angle of the slider decreases with a decrease in air density, a reduction in a floating distance of the trailing end can be suppressed, thereby preventing an extreme reduction in a floating distance of the magnetic function part.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 2:
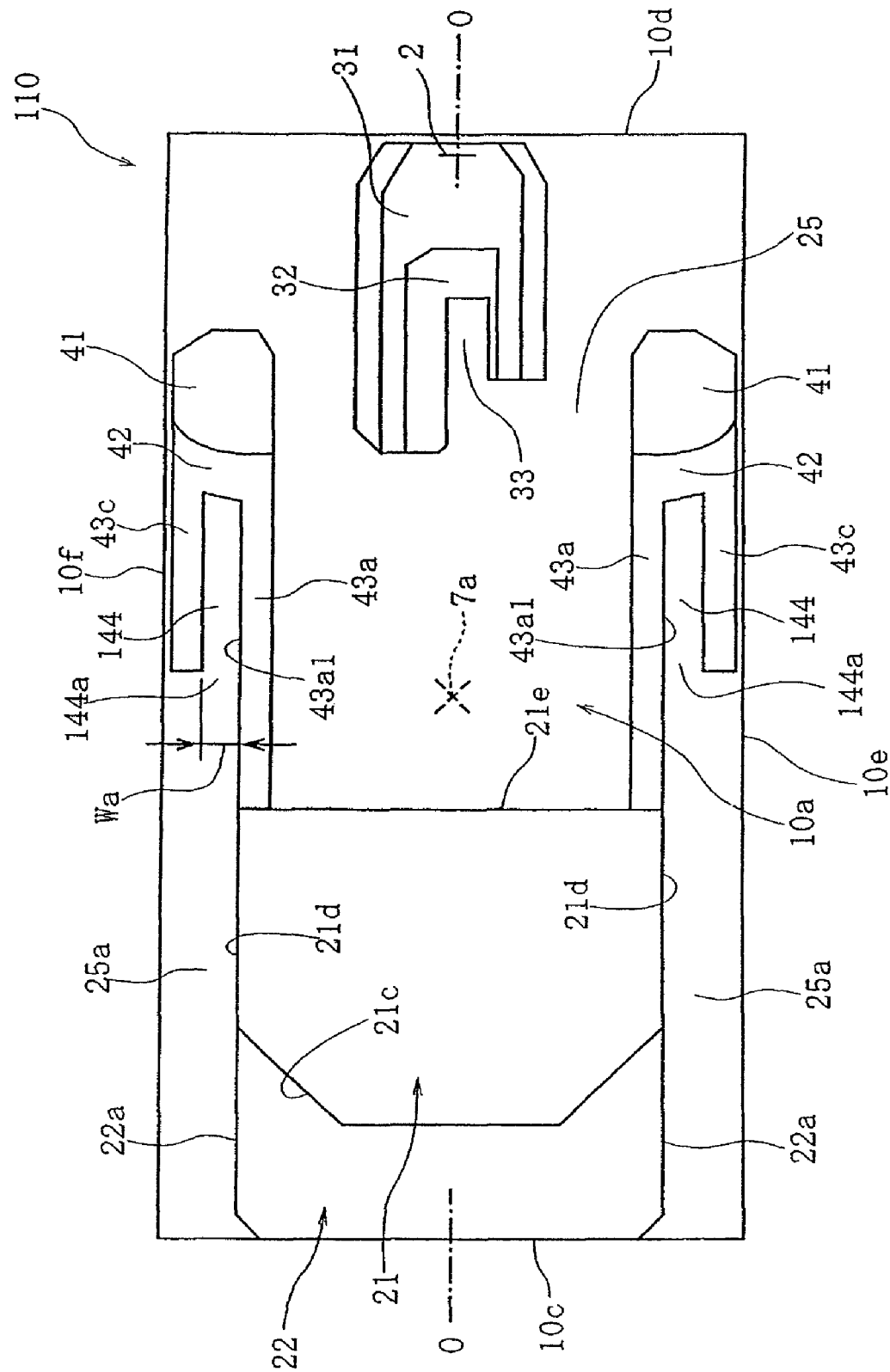
FIG. 2 is a plan view showing a slider, which is to be assembled to a magnetic head device according to a second embodiment of the present invention, with a recording medium-facing side directed upward.
Figure 3:
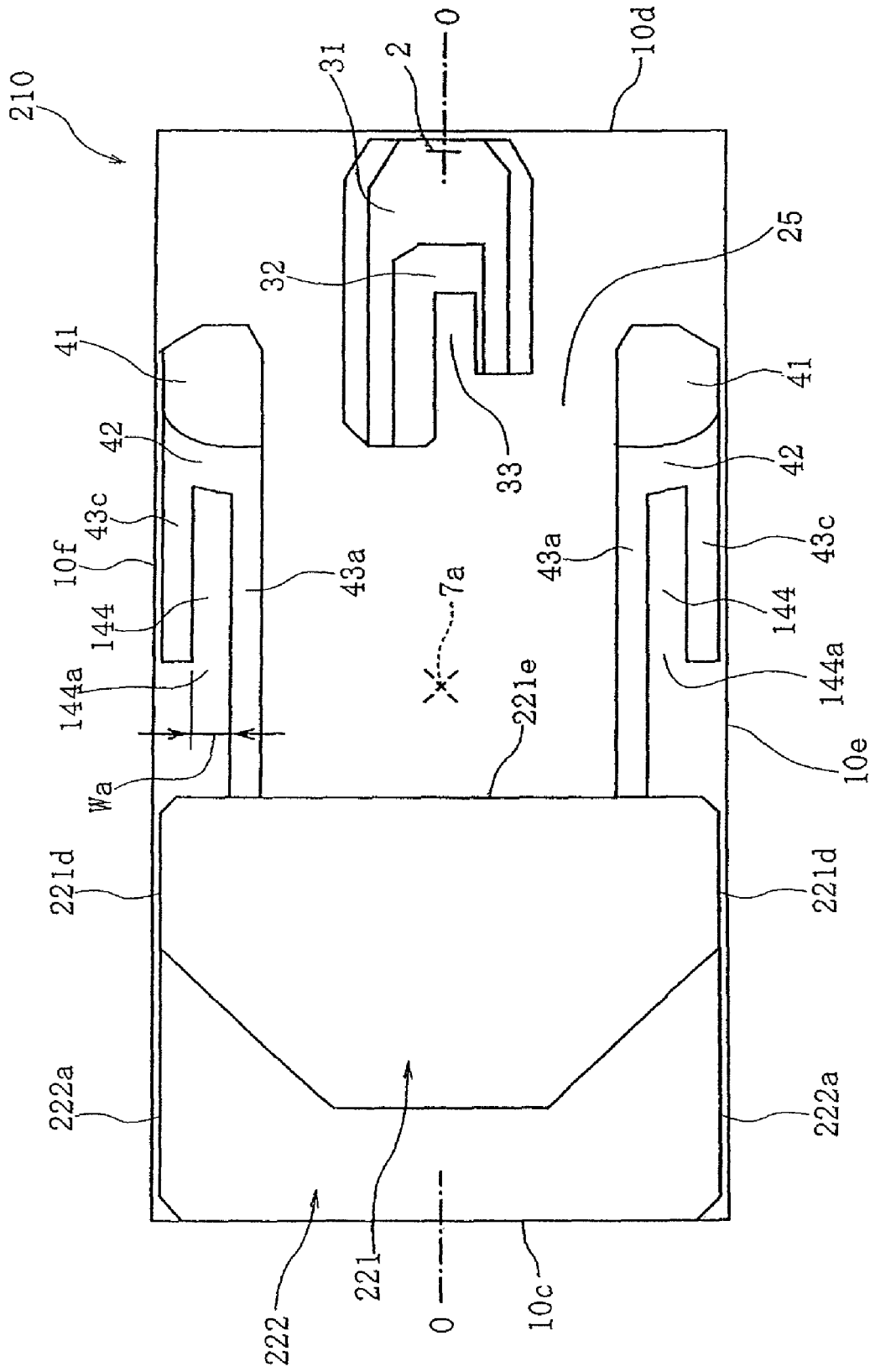
FIG. 3 is a plan view showing a slider, which is to be assembled to a magnetic head device according to Comparative Example, with a recording medium-facing side directed upward.
Figure 4:
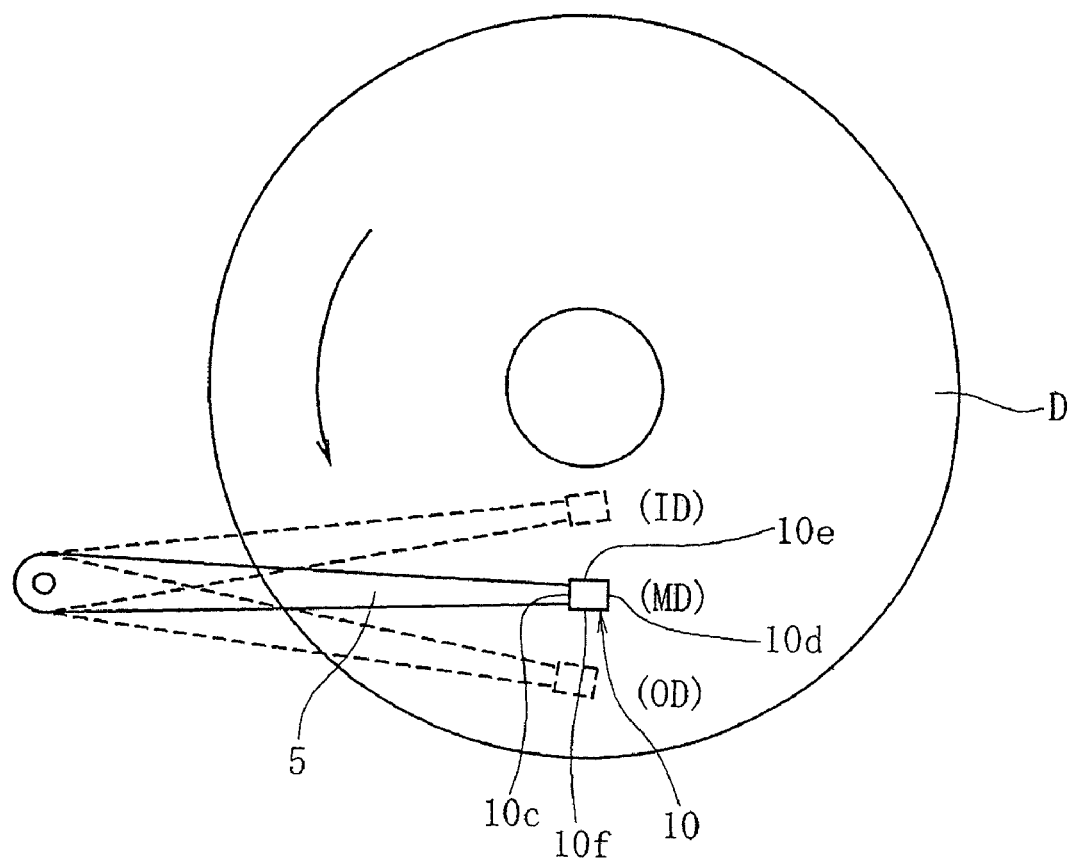
FIG. 4 is a plan view showing how a recording medium and a magnetic head are opposed to each other.
Figure 5:
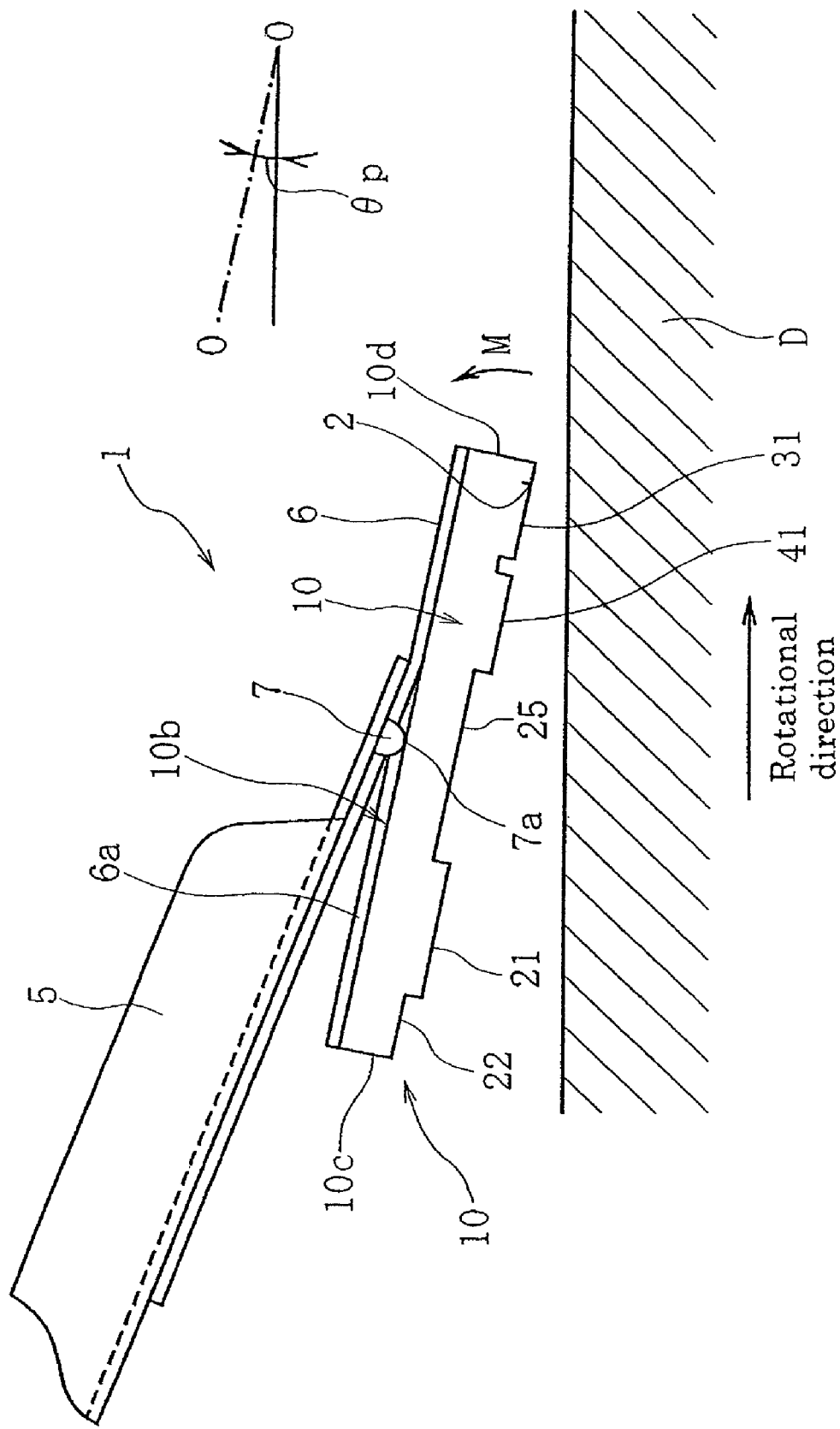
FIG. 5 is a partial side view showing a magnetic head device.
Figure 6:
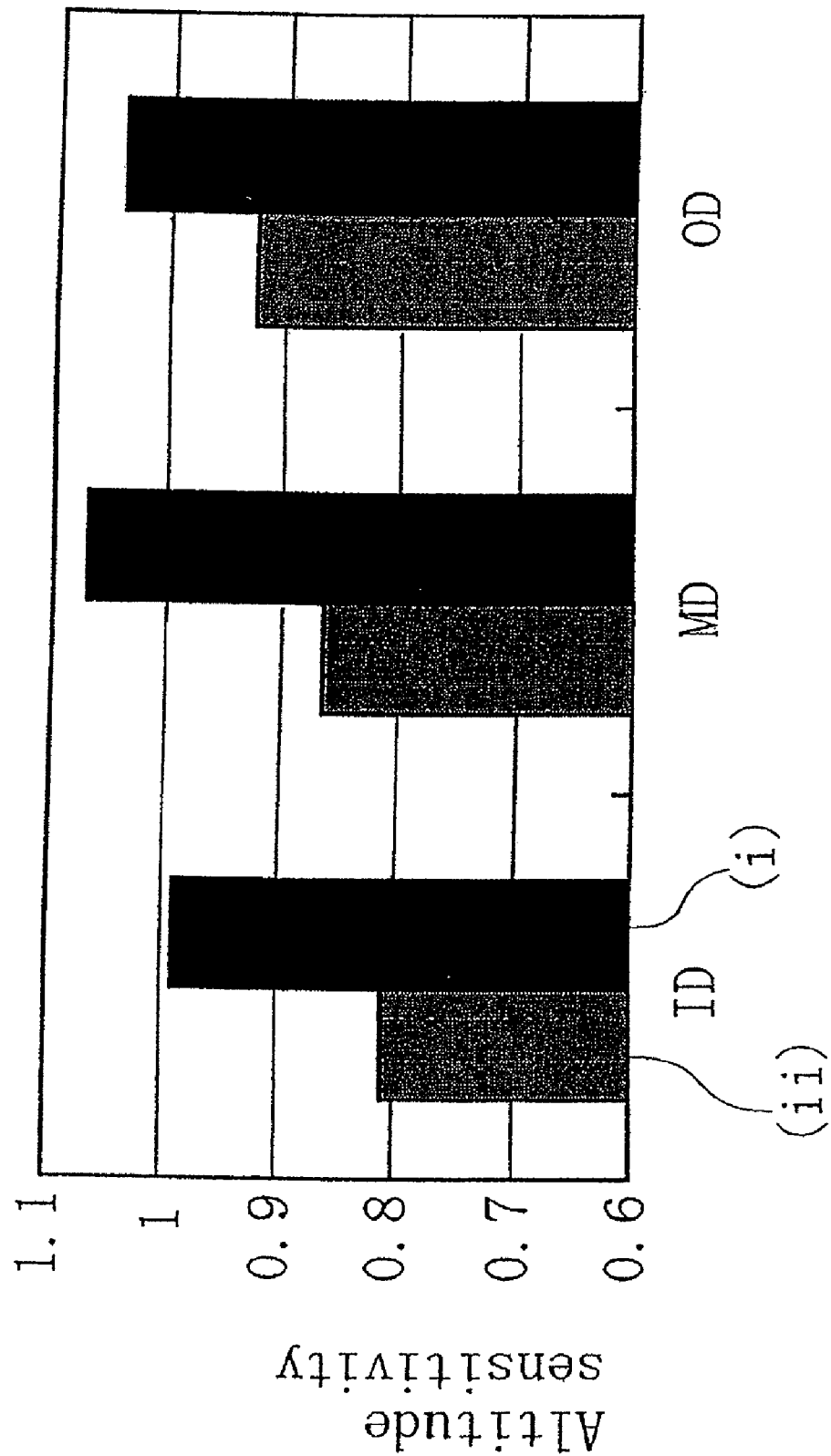
FIG. 6 is a graph showing evaluation results of Example and Comparative Example.

FIG. 1(A) is a plan view showing a slider, which is to be assembled to a magnetic head device according to a first embodiment of the present invention, with a recording medium-facing side directed upward, and FIG. 1(B) is a side view from a direction of an arrow B in FIG. 1(A). FIG. 2 is a plan view showing a slider, which is to be assembled to a magnetic head device according to a second embodiment of the present invention, with a recording medium-facing side directed upward. FIG. 3 is a plan view showing a slider, which is to be assembled to a magnetic head device according to Comparative Example, with a recording medium-facing side directed upward. FIG. 4 is a plan view showing how a recording medium and a magnetic head device are opposed to each other, and FIG. 5 is a side view showing a supporting device that supports a slider. FIG. 6 is a graph showing a variation in floating amount for Example and Comparative Example.

FIGS. 1(A) and 1(B) show a slider 10 to be assembled to a magnetic head device 1 according to one embodiment of the present invention. The slider 10 is formed of, for example, aluminum-titanium carbide into a cubic shape, and a magnetic function part 2 is disposed at a trailing end of the slider 10.

The magnetic function part 2 includes: a reading function part for reading a magnetic signal recorded on a recording medium D by making use of a magnetoresistance effect (an MR effect), a giant magnetoresistance effect (a GMR effect) or a tunneling magnetoresistance effect (a TMR effect); and a recording function part for recording a magnetic signal on the recording medium D. In the recording function part, a yoke of a magnetic material and a coil of a conductive material are formed by a thin film process.

In FIG. 1(A), the slider 10 is shown with a facing side 10a, which is to be opposed to the recording medium D, directed upward. As shown in FIG. 1(B), the opposite side from the recording medium D-facing side 10a is a pressed side 10b subjected to a pressing force F by which the slider 10 is pressed to the recording medium D. The slider 10 has a leading end face 10c directed to a side from which an airflow generated on the surface of the recording medium D flows in and a trailing end face 10d directed to a side from which the airflow flows out. The magnetic function part 2 is disposed close to the trailing end face 10d.

The slider 10 also has a side face 10e on a diametrically inner side (ID side) and a side face 10f on a diametrically outer side (OD side). That is, the side face 10e is directed to a rotation center of the recording medium D adopting a magnetic recording method, such as a hard disk shown in FIG. 4, while the side face 10f is directed to the circumference of the recording medium.

As used herein, the term "front" or "forwardly" refers to a direction toward the leading end face 10c, the term "front end" refers to an end directed toward the leading end face 10c, the term "rear" or "rearwardly" refers to a direction toward the trailing end face 10d, and the term "rear end" refers to an end directed toward the trailing end face 10d. In addition, the term "transverse direction" refers to a direction parallel to the leading end face 10c and the trailing end face 10d, the term "left side" refers to a side directed toward the diametrically inner side face 10e, and the term "right side" refers to a side directed toward the diametrically outer side face 10f.

In FIG. 1(A), the longitudinally extending centerline, which divides each of the leading end face 10c and the trailing end face 10d into two, is designated by O-O. The center of the magnetic function part 2 coincides with the centerline O-O.

In the magnetic head device 1, as shown in FIG. 5, the pressed side (backing side) 10b of the slider 10 is supported by a supporting device. The support device is provided with a loading beam 5 that is an elastic support member. An elastic deformation part is disposed at a base of the loading beam 5. Owing to an elastic force of the elastic deformation part, a pressing force F toward the recording medium D is applied to the slider 10. A flexure 6, which is formed of an elastic plate thinner than the loading beam 5 and has resiliency, is fixed to a tip of the loading beam 5. The pressed side (backing side) 10b of the slider 10 is bonded to a support piece 6a bent from the main body of the flexure 6.

A downwardly projecting pivot 7 is integrally formed with the tip of the loading beam 5. The pivot 7 is brought into contact with either the pressed side (backing side) 10b of the slider 10 or the support piece 6a. An elastic pressing force exhibited by the loading beam 5 intensively acts on a working fulcrum 7a that is a contact point between the pivot 7 and the pressed side 10b of the slider 10.

The support piece 6a of the flexure 6 is deformable in any direction. Thus, the slider 10 fixed to the support piece 6a is supported such that its posture is changeable with its supporting point at the working fulcrum 7a, which is a contact point with the pivot 7. The postural change occurs mainly in two directions, i.e., a pitching direction and a rolling direction. The term "pitching" refers to an inclination of the centerline O-O, and the term "rolling" refers to an inclination about the centerline O-O. In FIG. 5, θ p designates a pitch angle which the centerline O-O of the slider 10 makes with the surface of the recording medium D in a floating posture where the leading end face 10c is lifted up.

The working fulcrum 7a, which is a contact point between the pivot 7 and the slider 10, is projected in FIG. 1(A). The working fulcrum 7a is located on the centerline O-O and almost at the midpoint between the leading end face 10c and the trailing end face 10d.

As shown in FIGS. 1(A) and 1(B), the facing side 10a of the slider 10 has a front positive pressure surface 21 in front of the working fulcrum 7a. The front positive pressure surface 21 is a plane to be opposed to the recording medium D and larger in width (transverse dimension) than in length (longitudinal dimension). The front positive pressure surface 21 has a front edge 21a, inclined edges 21c, 21c, side edges 21d, 21d and a rear edge 21e. The front edge 21a is parallel to and spaced rearwardly apart from the leading end face 10c of the slider 10. The inclined edges 21c, 21c are located at left and right sides of the front edge 21a and gradually recede rearwardly with a distance from the centerline O-O in the transverse direction. The side edges 21d, 21d are located closer to the centerline O-O than the side faces 10e, 10f of the slider 10. The rear edge 21e is parallel to the front edge 21a and located in front of the working fulcrum 7a.

Between the leading end face 10c of the slider 10 and the front edge 21a and the inclined edges 21c, 21c of the front positive pressure surface 21, there is disposed a front step surface 22. As shown in FIG. 1(B), the front step surface 22 is spaced farther apart from the recording medium D than the front positive pressure surface 21 to have a difference in level therebetween. The difference in level between the front step surface 22 and the front positive pressure surface 21 is about 0.1 µm.

Behind the rear edge 21e of the front positive pressure surface 21, there is disposed a negative pressure surface 25. The negative pressure surface 25 is a plane that is spaced farther apart from the recording medium D than the front step surface 22 and extends to the trailing end face 10d and both the side faces 10e, 10f of the slider 10. The difference in level between the front step surface 22 and the negative pressure surface 25 is about 1 to 3 µm.

On the facing side 10a of the slider 10, a rear positive pressure surface 31 is located behind the working fulcrum 7a and in the immediate vicinity of the trailing end face 10d. The rear positive pressure surface 31 is a plane that is at the same level as the front positive pressure surface 21 and has an area sufficiently smaller than that of the front positive pressure surface 21. In front of the rear positive pressure surface 31, there is disposed a rear step surface 32. The rear step surface 32 is a plane that is at the same level as the front step surface 22 and spaced farther apart from the recording medium D than the rear positive pressure surface 31. Moreover, a forwardly extending rear air inlet groove 33 is formed by removing the inside of the rear step surface 32 in the form of a groove. The rear air inlet groove 33 opens forwardly. The bottom surface of the rear air inlet groove 33 is coplanar with the negative pressure surface 25.

The magnetic function part 2 is disposed in a rear part of the rear positive pressure surface 31.

Between the front positive pressure surface 21 and the rear positive pressure surface 31, there are disposed side positive pressure surfaces 41, 41. The side positive pressure surfaces 41, 41 are spaced apart from each other in the transverse direction with the centerline O-O therebetween and located close to the side faces 10e, 10f. The left and right side positive pressure surfaces 41, 41 are spaced rearwardly apart from the working fulcrum 7a. The side positive pressure surfaces 41, 41 are planes that are at the same level as the front positive pressure surface 21 and the rear positive pressure surface 31. The total area of the side positive pressure surfaces 41, 41 is smaller than that of the front positive pressure surface 21.

In front of each side positive pressure surface 41, there is disposed a side step surface 42. The side step surface 42 is a plane that is at the same level as the front step surface 22 and the rear step surface 32.

In front of each side positive pressure surface 41, there are disposed an inner guide bank 43a and an outer guide bank 43b. The inner guide bank 43a is located closer to the centerline O-O than the outer guide bank 43b. The outer guide bank 43b is located immediately inside corresponding one of the side faces 10e, 10f of the slider 10. The inner guide bank 43a and the outer guide bank 43b are planes that are at the same level as and continuous with the side step surface 42.

The inner guide bank 43a extends parallel with the centerline O-O and is connected at its front end to the rear edge 21e of the front positive pressure surface 21. The outer guide bank 43b also extends parallel with the centerline O-O and is spaced apart from the inner guide bank 43a in the transverse direction. One outer guide bank 43b extends between the side edge 21d of the front positive pressure surface 21 and the diametrically inner side face 10e of the slider 10 and reaches to the leading end face 10c. The other outer guide bank 43b extends between the side edge 21d of the front positive pressure surface 21 and the diametrically outer side face 10f of the slider 10 and reaches to the leading end face 10c.

In front of each side step surface 42, there is disposed a side air inlet groove 44. Rearward of the rear edge 21e of the front positive pressure surface 21, the side air inlet groove 44 is formed between the inner guide bank 43a and the outer guide bank 43b; forward of the rear edge 21e, the side air inlet groove 44 is formed between the side edge 21d of the front positive pressure surface 21 and the outer guide bank 43b and between a side edge 22a of the front step surface 22 and the outer guide bank 43b. That is, each of the side air inlet grooves 44, 44 extends continuously forwardly from the side step surface 42, alongside the front positive pressure surface 21 and the front step surface 22, and to the leading end face 10c. The side air inlet groove 44 has a mouth (open end) 44a coinciding with the leading end face 10c. The bottom surface of the side air inlet groove 44 is a plane that is at the same level as the negative pressure surface 25.

It should be noted that although all the positive pressure surfaces, the step surfaces, and the negative pressure surface described hereinabove are referred to as a plane, the term "plane" as used herein includes not only a pure plane with an infinite radius of curvature but also a curved surface with a great radius of curvature.

As shown in FIGS. 4 and 5, when the recording medium D rotates with the facing side 10a of the slider 10 being opposed to the recording medium D, an airflow (air bearing) generated on the surface of the recording medium D flows into a space between the recording medium D and the slider 10 from the leading end face 10c.

On the facing side 10a of the slider 10, the airflow is introduced into the front positive pressure surface 21 through the front step surface 22. The airflow flowing between the front positive pressure surface 21 and the recording medium D generates a floating pressure which acts to lift up the front positive pressure surface 21 away from the recording medium D. Behind the rear edge 21e of the front positive pressure surface 21, there is a large difference in level between the front positive pressure surface 21 and the negative pressure surface 25. The inner guide banks 43a, 43a are located at both sides of this recessed area. The recessed area behind the rear edge 21e and between the inner guide banks 43a, 43a is called a negative pressure generating part 23. As the airflow after flowing along the surface of the front positive pressure surface 21 flows into the negative pressure generating part 23, the negative pressure generating part 23 generates a negative pressure which acts to bring the slider 10 closer to the recording medium D. The floating distance of the leading end face 10c of the slider 10 from the surface of the recording medium D is adjusted with the positive pressure acting on the front positive pressure surface 21 and the negative pressure acting on the negative pressure generating part 23.

In the vicinity of the rear end of the slider 10, the airflow is concentrated and guided by the rear air inlet groove 33 and then introduced through the rear step surface 32 into a space between the rear positive pressure surface 31 and the recording medium D. With this airflow, a positive pressure also acts on the rear positive pressure surface 31. As a result, as shown in FIG. 5, when subjected to a pressure generated by air coming into contact with the facing side 10a of the slider 10, the slider 10 floats up in such an inclined posture that the leading end face 10c is lifted up with an pitch angle θ p with respect to the surface of the recording medium D. Moreover, since a floating force acts on the rear positive pressure surface 31, the trailing end face 10d floats up with a given distance from the surface of the recording medium D, thereby maintaining a spacing between the magnetic function part 2 in the vicinity of the trailing end face 10d and the recording medium D.

Along the diametrically inner and outer side areas of the slider 10, the airflow on the surface of the recording medium D flows into the side air inlet grooves 44 through the mouths 44a without being blocked by the front step surface 22 and the front positive pressure surface 21. The airflow in these side areas is guided rearwardly through the side air inlet grooves 44 and then introduced into the surface of the side positive pressure surfaces 41 through the side step surfaces 42. Thus, the airflow is always concentrated at the side positive pressure surfaces 41, whereby the left and right side positive pressure surfaces 41 always generate a stable positive pressure.

The positive pressure acting on both the side positive pressure surfaces 41 prevents the slider in a floating posture from easily fluctuating in the rolling direction, thereby stabilizing the floating posture of the slider 10.

In addition, since the side positive pressure surfaces 41 always subjected to a stable floating pressure are inhibited from descending toward the recording medium D, it is possible to always stabilize the distance between the trailing end face 10d and the recording medium D. Thus, the floating distance of the magnetic function part 2 from the surface of the recording medium D can be stabilized.

When the magnetic head device 1 is used at a high altitude or in an airplane, the air density of an environment is reduced, and hence, the positive pressure acting on the front positive pressure surface 21 and the positive pressure acting on the rear positive pressure surface 31 are also reduced to let the whole slider 10 descend toward the surface of the recording medium D. However, even when the air density is reduced, the airflow is guided through the side air inlet grooves 44 and stably concentrated at the side positive pressure surfaces 41, so that the positive pressure acting on both the side positive pressure surfaces 41 are always stabilized to prevent the side positive pressure surfaces 41 from greatly descending toward the recording medium D.

As shown in FIG. 5, the front positive pressure surface 21 and the working fulcrum 7a are located forward of the side positive pressure surfaces 41, and the side positive pressure surfaces 41 are prevented from greatly descending toward the recording medium D by the positive pressure. Hence, when the floating pressure acting on the front positive pressure surface 21 decreases with a decrease in air density, a moment M acts on the slider 10 to let the leading end face 10c descend with a fulcrum at a point where the side positive pressure surface 41 faces the recording medium D, as shown in FIG. 5. With the moment M, conversely, the trailing end face 10d is lifted up away from the recording medium D with a fulcrum at the side positive pressure surface 41. Accordingly, although the pitch angle θ p decreases with a decrease in air density, the floating distance of the magnetic function part 2 is prevented from decreasing and stabilized.

Figure 1:
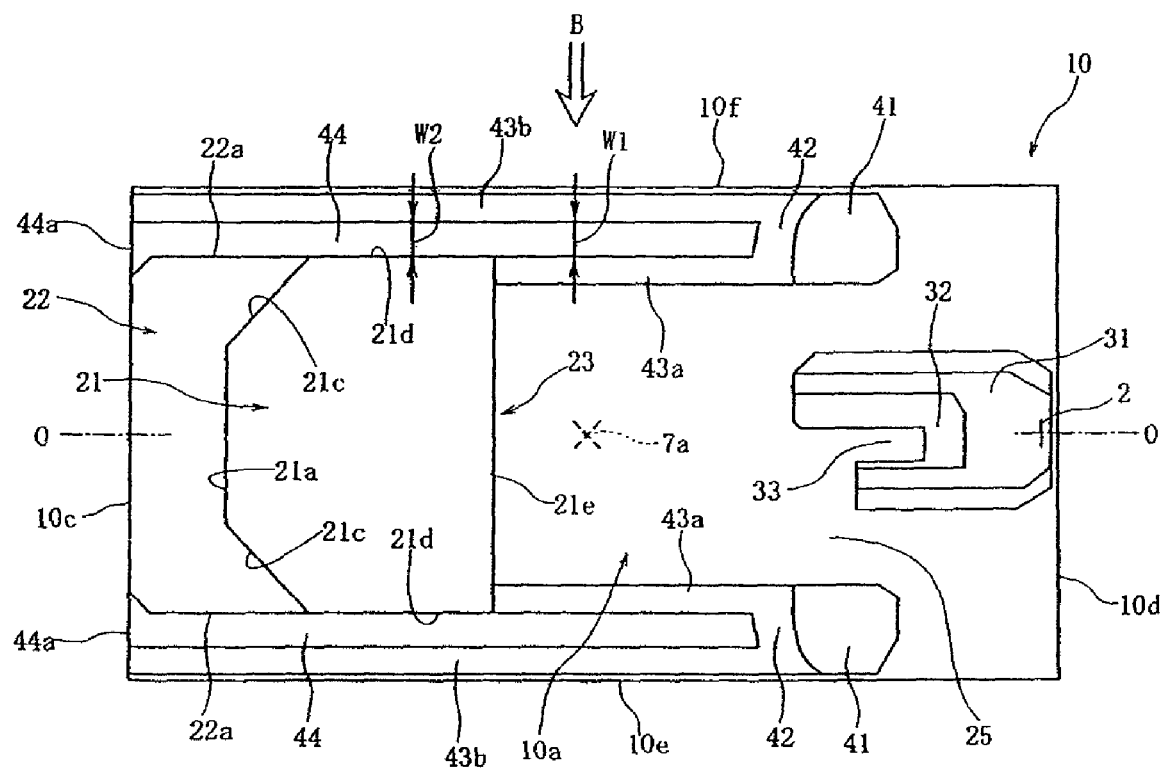
FIG. 1(A) is a plan view showing a slider, which is to be assembled to a magnetic head device according to a first embodiment of the present invention, with a recording medium-facing side directed upward.
FIG. 1(B) is a side view from a direction of an arrow B in FIG. 1(A)
Figure 1:
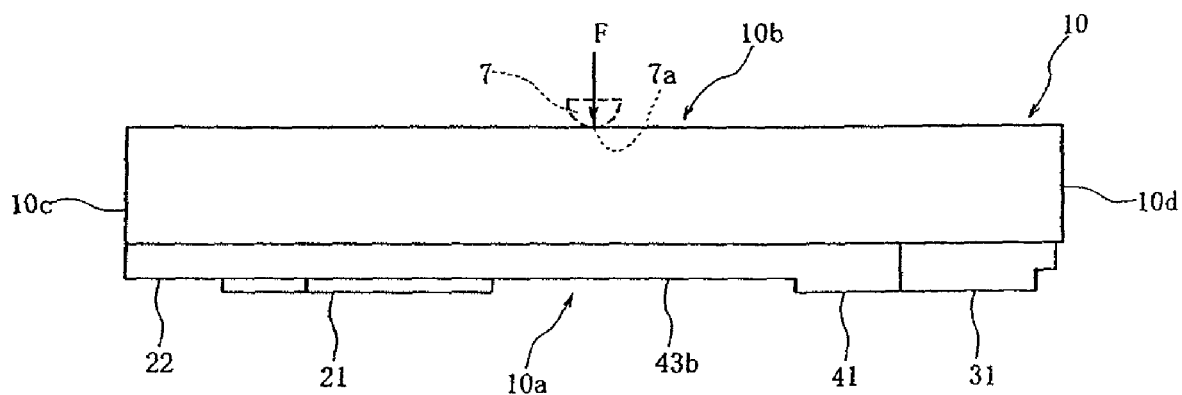

In the first embodiment shown in FIG. 1, the outer guide bank 43b is not necessarily required to reach the leading end face 10c. In an alternative, the front end of the outer guide bank 43b may be located alongside the front step surface 22 or the front positive pressure surface 21, i.e., the mouth 44a of the side air inlet groove 44 may be located alongside the front step surface 22 or the front positive pressure surface 21.

The width of the side air inlet groove 44 may be constant throughout its length or may gradually increase toward the leading end face 10c. In addition, it is not necessarily required that W1 is equal to W2, wherein W1 represents a width of the side air inlet groove 44 at a position between the outer guide bank 43b and the inner guide bank 43a, and W2 represents a width of the side air inlet groove 44 at a position between the outer guide bank 43b and the side edge 21d of the front positive pressure surface 21 or the side edge 22a of the front step surface 22. W2 may be either larger or smaller than W1.

FIG. 2 shows a slider 110, which is to be assembled to a magnetic head device according to a second embodiment of the present invention, with the recording medium D-facing side 10a directed upward. In the slider 110 shown in FIG. 2, the portions having the same shape as those of the slider 10 shown in FIG. 1(A) are designated by the same reference symbols, and the detailed description is omitted.

In the slider 110 shown in FIG. 2, the side step surface 42 and the inner guide bank 43a located in front of the side positive pressure surface 41 are identical to those of the slider 10 shown in FIG. 1(A). However, an outer guide bank 43c integrally formed with the side step surface 42 is shorter than the outer guide bank 43b shown in FIG. 1(A), so that the front end of the outer guide bank 43c is located rearward of the rear edge 21e of the front positive pressure surface 21.

In front of the side step surface 42, a side air inlet groove 144 is formed between the inner guide bank 43a and the outer guide bank 43c. The side air inlet groove 144 has a mouth 144a that is located rearward of the rear edge 21e of the front positive pressure surface 21. However, neither the front step surface 22 nor the front positive pressure surface 21 lies between the mouth 144a of the side air inlet groove 144 and the leading end face 10c, so that the area defined between corresponding one of the side faces 10e, 10f and the side edge 22a of the front step surface 22 and the side edge 21d of the front positive pressure surface 21 serves as an air guide part 25a. The air guide part 25a is a plane that is at the same level or almost the same level as the negative pressure surface 25 and reaches to corresponding one of the side faces 10e, 10f.

In the slider 110 shown in FIG. 2, the area in front of the mouth 144a of the side air inlet groove 144 is not occupied by the front step surface 22 and the front positive pressure surface 21. In front of the mouth 144a of the side air inlet groove 144, more specifically, there is provided the air guide part 25a that is at the same level or almost the same level as the negative pressure surface 25. Accordingly, when an airflow generated on the surface of the recording medium D flows in from the leading end face 10c of the slider 10, it directly flows into the side air inlet groove 144 through the air guide part 25a without being blocked. Then, the airflow guided within the side air inlet groove 144 is introduced into the side step surface 42 and then concentrated at the side positive pressure surface 41.

Therefore, even when the air density is low, the side positive pressure surface 41 is always subjected to a stable floating pressure, preventing an extreme reduction in the floating distance of the magnetic function part 2.

In the embodiment shown in FIG. 2, neither the front step surface 22 nor the front positive pressure surface 21 lies in front of the side air inlet groove 144 over the entire width Wa thereof. That is, the side edge 22a of the front step surface 22 and the side edge 21d of the front positive pressure surface 21 are coplanar with the an outer face 43a1 of the inner guide bank 43a. However, it is also possible that at least either the side edge 21d or the side edge 22a is located slightly closer to corresponding one of the side faces 10e, 10f than the outer face 43a1, so that the area in front of the side air inlet groove 144 is occupied over part of the width Wa by either the front step surface 22 or the front positive pressure surface 21. In this case, however, it is preferred that the area in front of the side air inlet groove 144 is not occupied over at least half of the width Wa by the front step surface 22 and the front positive pressure surface 21.

While the present invention has been particularly shown and described with reference to embodiments thereof, it will be understood by those skilled in the art that various changes in form and detail may be made therein without departing from the spirit, scope and teaching of the invention.

EXAMPLE

A magnetic head device using a slider 10 shown in FIGS. 1(A) and 1(B) was prepared as Example.

Comparative Example

A magnetic head device using a slider 210 shown in FIG. 3 was prepared as Comparative Example. The slider 210 of Comparative Example was a modification of the slider 110 according to the second embodiment shown in FIG. 2. In the slider 210 shown in FIG. 3, side edges 221d of a front positive pressure surface 221 and side edges 222a of a front step surface 222 were located close to the side faces 10e, 10f of the slider 210.

Accordingly, the mouth 144a of each side air inlet groove 144 was opposed to a rear edge 221e of the front positive pressure surface 221 over the entire width Wa. Thus, the airflow flowing in from the leading end face 10c was blocked by the front step surface 222 and the front positive pressure surface 221. This made it difficult for the airflow to directly flow into the side air inlet grooves 144. Hence, the slider 210 could not stabilize a positive pressure generating at the side positive pressure surfaces 41, as compared with the sliders 10, 110 according to the embodiments of the present invention.

EVALUATION

Computer simulations were done for a slider having the same structure as that of the magnetic head device of Example and a slider having the same structure as that of the magnetic head device of Comparative Example. In these simulations, the slider 10 of the magnetic head device 1 had a long side of 1.24 mm and a short side of 0.70 mm. The difference in level between the front positive pressure surface 21 and the front step surface 22 was set at 0.10 µm, and the difference in level between the front positive pressure surface 21 and the negative pressure surface 25 was set at 1.53 µm. The pressing force (loading pressure) acting on the working fulcrum 7a toward the recording medium D was set at 24.5 mN, and the number of rotation of the recording medium D was set at 5400 rpm.

FIG. 6 shows the evaluation results. On the horizontal axis, OD refers to a case where the slider was located at the diametrically outermost position in the storage area of the recording medium D, ID refers to a case where the slider was located at the diametrically innermost position, and MD refers to a case where the slider was located at the midpoint, as shown in FIG. 4. The distance from the rotational center of the recording medium to the centerline O-O of the slider was 14.2 mm in the case of ID, 22.3 mm in the case of MD, and 30.2 mm in the case of OD.

The vertical axis of FIG. 6 indicates a floating amount ratio due to a change in air density. More specifically, this indicates a floating distance under a pressure of 0.7 atmospheres, wherein a floating distance of the magnetic function part 2 from the recording medium D under a pressure of 1 atmosphere is taken as 1.

Referring to FIG. 6, the reduction in floating amount was smaller in Example (i) than in Comparative Example (ii). Rather, in some cases of Example (i), the floating distance under a pressure of 0.7 atmospheres was larger than the floating distance under a pressure of 1 atmosphere. This seems to be because even when the floating pressure acting on the front positive pressure surface 21 decreased with a decrease in air density, the positive pressure acting on the side positive pressure surface 41 remained stable, so that the leading end face 10c of the slider 10 descended with a fulcrum at a point where the side positive pressure surface 41 faced to the recording medium D, thus decreasing the pitch angle θ p. At this time, conversely, the trailing end face 10d was lifted up.

The invention claimed is:
1. A magnetic head device comprising:
a slider having a facing side opposed to a recording medium and a pressed side subjected to a pressing force toward said recording medium; and
a magnetic function part disposed close to a trailing end of said slider to perform at least either magnetic recording or magnetic reproducing,
wherein said facing side of said slider includes a front positive pressure surface located close to a leading end of said slider, a rear positive pressure surface located close to said trailing end, and a pair of side positive pressure surfaces located closer to said trailing end than said front positive pressure surface and disposed at both sides of a longitudinally extending centerline,
wherein air inlet grooves for introducing air into said side positive pressure surfaces are each disposed in front of each said side positive pressure surface, and each said air inlet groove extends between said front positive pressure surface and a corresponding side face of said slider and opens toward a leading end face of said slider.

2. The magnetic head device according to claim 1, wherein each said air inlet groove opens forwardly on said leading end face of said slider.

3. A magnetic head device comprising:
a slider having a facing side opposed to a recording medium and a pressed side subjected to a pressing force toward said recording medium; and
a magnetic function part disposed close to a trailing end of said slider to perform at least either magnetic recording or magnetic reproducing,
wherein said facing side of said slider includes a front positive pressure surface located close to a leading end of said slider, a rear positive pressure surface located close to said trailing end, and a pair of side positive pressure surfaces located closer to said trailing end than said front positive pressure surface and disposed at both sides of a longitudinally extending centerline,
wherein air inlet grooves for introducing air into said side positive pressure surfaces are each disposed in front of each said side positive pressure surface with an air guide part, which leads to each said air inlet groove, being disposed between said front positive pressure surface and a corresponding side face of said slider.

4. The magnetic head device according to claim 3, wherein each said air inlet groove has a forwardly opening mouth located closer to said trailing end than said front positive pressure surface.

* * * * *